Oct. 9, 1945.   H. E. DRENNAN   2,386,200
RECOVERY OF DIOLEFINS
Filed Aug. 19, 1940
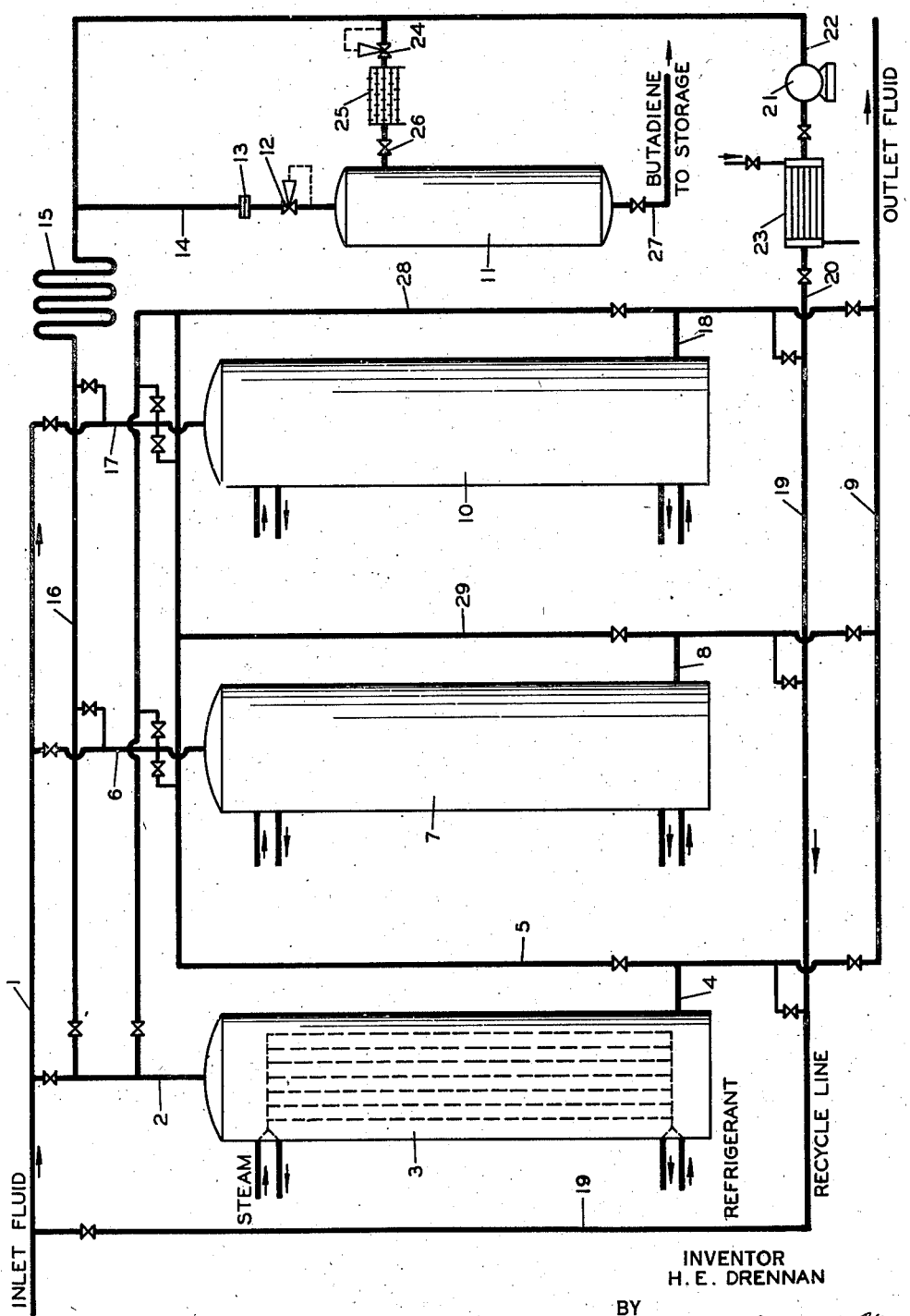
INVENTOR
H. E. DRENNAN
BY
ATTORNEY Patented Oct. 9, 1945

2,386,200

UNITED STATES PATENT OFFICE 2,386,200

RECOVERY OF DIOLEFINS

Harry E. Drennan, Bartlesville, Okla., assignor to Phillips Petroleum Company, a corporation of Delaware Application August 19, 1940, Serial No. 353,308

5 Claims. (Cl. 260—681.5)

This invention relates to an improved process for the recovery of diolefins from hydrocarbon fluids containing same. More specifically it relates to an improvement in the process for absorbing and recovering butadiene, cyclopentadiene, isoprene, and various hexadienes from hydrocarbon fluids through the use of reagents comprising solid adsorbent carriers impregnated with cuprous halides.

The production of butadiene by various thermal or catalytic processes such as the cracking of petroleum fractions and the catalytic dehydrogenation of butanes and butenes involves the intermediate production of complex hydrocarbon mixtures which contain besides butadiene high percentages of paraffinic and olefinic hydrocarbons as well as acetylene derivatives. Thus it is necessary to employ efficient and specific absorption processes for the concentration and recovery of butadiene from said mixtures.

Earlier described processes have suggested the use of solutions of certain metal salts, particularly monovalent salts of the heavy metals of groups 1 and 2 of the periodic system. These processes utilizing salt solutions are subject to numerous operating difficulties and technical disadvantages, and recently more satisfactory processes utilizing solid reagents impregnated with cuprous halides have been described in a co-pending application Serial No. 354,086 filed August 24, 1940. The use of solid reagents has promoted more efficient absorption of butadiene from hydrocarbon gases or liquids, together with the recovery of butadiene concentrates of higher purity.

After such process steps as have been employed to increase the selectivity of absorption of butadiene in the form of the cuprous chloride complex on the reagent surfaces, some improvement has been desirable in the desorbing operations to facilitate the recovery of the butadiene in a corresponding state of purity. The contamination during the desorption step has been due to hydrocarbon fluids which remain in the reagent space after the absorption step is discontinued, and to components of so-called inert gases which have been used to sweep out said reagent space at various stages of the desorption process.

I have now discovered a method of operation which substantially eliminates possibility of contamination, and I have found that operation according to the terms of my invention yields butadiene in a state of purity corresponding to the purity of the addition compound formed on the surfaces of the solid cuprous chloride reagent.

In one specific embodiment, my invention consists of recovering butadiene from a portion of reagent completely spent in the absorption of said diolefin by the successive steps of purging the reagent container with pure butadiene vapor previously separated by my process, heating said reagent by the circulation of heated pure butadiene vapor, and finally after the rapid desorption temperature is reached, withdrawing and condensing the desorbed butadiene in substantially pure form. Additional steps which ordinarily accompany the above-mentioned operations are those of discontinuing the circulation of butadiene vapors when the evolution of butadiene from the reagent has ceased, releasing the system pressure through a condenser into the butadiene storage tank, and circulating a portion of the fluid being treated through the reagent bed while it is being cooled to the absorption temperature range.

This process may be illustrated by the flow diagram of the drawing which outlines one arrangement of apparatus for the application of my invention. The drawing shows three absorption reagent towers so connected that any two may be used in series for absorption while the third is being treated for the desorption of butadiene. These towers are fitted with internal coils through which either a heating or a cooling medium may be circulated depending on the operation being performed.

Assuming that towers 3 and 7 are in series for the absorption step and that tower 10 is being treated for the desorption of butadiene, the hydrocarbon fluid enters by manifold line 1 and passes by line 2 into the top of tower 3. The fluid exits by line 4 and passes through line 5 and into line 6 which is the inlet to tower 7. The effluent from 7 exits by line 8 into the outlet manifold 9.

When the desorption in tower 10 is begun, butadiene vapor from tank 11 passes out through pressure regulating valve 12 and meter 13 through line 14, and through heater 15 and line 16 into line 17 which is the inlet line of tower 10. An ample volume of this butadiene vapor is metered out to purge the residual unreacted hydrocarbon liquid and/or gas out of tower 10. This purge gas leaves the tower by line 18 and is recycled through line 19 back into the inlet fluid line 1 for recovery of the butadiene. After purging is complete steam is applied to heater 15, and admitted to the coils of tower 10. The circulation of hot butadiene vapor is begun through line 20, blower 21, line 22, heater 15, line 16 and line 17 until the temperature of the reagent in tower 10 reaches the desorption level. As butadiene is desorbed, pressure builds up in the circulating system, and this pressure due to evolved butadiene is relieved by partial cooling in exchanger 23, and the continuous removal of butadiene through pressure regulating valve 24, condenser 25 and line 26 into run tank 11. As the liquid level in run tank 11 builds up, butadiene is removed to storage by line 27.

When the desorption of the butadiene is complete, valve 12 is closed and valve 24 is opened and the remaining butadiene vapor in tower 10 is taken into the run tank. The reagent bed is then cooled for the absorption step by circulating refrigerant in the internal tower coils, and, if desired, by circulation of gas from the inlet manifold by line 17 through the blower and cooler until the required temperature has been reached. Tower 10 is then ready for use and may be placed in the absorption series when tower 1 is completely saturated with butadiene.

In the three tower system outlined in Figure 1, one tower is desorbed or regenerated at regular intervals of 8 to 12 hours or longer, depending on the weight of reagent and the diolefin content of the fluid being treated. When the reagent in a tower has reacted with butadiene until the metal salt-butadiene complex is in equilibrium with the incoming hydrocarbon fluid, the tower is cut out of the absorbing series and the butadiene is desorbed. This three tower system is used by way of illustration only, and it is not to be understood that this is necessarily the preferred arrangement.

In carrying out the process as described the reagent may be a suitable adsorbent carrier such as fuller's earth, bauxite, charcoal, silica gel, activated alumina or the like impregnated with a cuprous halide or mixtures of cuprous halides in any convenient manner, such as soaking or spraying with suitable aqueous solutions or by other means.

Other metal salts which have some utility are those monovalent salts of the other heavy metals of groups 1 and 2 of the periodic system. The amount of metal salt to be added in the impregnation of the carrier may range from 10 to 50 per cent, and reagents containing about 20–30 per cent of cuprous halide are usually satisfactory.

I prefer to operate the absorption step of my process at temperatures within the range of 40° to 80° F. although higher or lower temperatures may be used in certain instances. In the preferred range the absorption of butadiene is rapid and the complex formed is suitably stable.

In the step of treating the reagent to desorb butadiene, temperatures of 120° to 210° F. are preferred, and rapid desorption results as temperatures in the higher portion of this range are attained.

Pressures required in the absorption step are usually low superatmospheric pressures. In general sufficient pressure is applied to insure satisfactory flow of hydrocarbons through the reagent towers and the auxiliary piping. In the desorption step low superatmospheric pressures are obtained by the use of the blower to aid in the circulation of heating and cooling vapors. Subatmospheric pressures may be produced on the suction side of the blower to expedite the removal of desorbed butadiene at or near the end of the desorption step.

Since the only gas used in the desorption operation is butadiene vapor previously produced by the process there is no chance of contamination, and a butadiene concentrate of higher purity is thus produced.

While the process is particularly well adapted to the recovery of butadiene from reagents of the solid type, satisfactory results are also obtained in treating butadiene-metal salt addition compounds from other sources. Thus I may operate my process to recover butadiene from the addition compound precipitated and separated by filtration or other means from metal salt solutions used to absorb butadiene from hydrocarbon fluids. In this case, the purity of the butadiene recovered will depend on the purity of the addition product as obtained.

The following examples will serve to illustrate results obtainable when operating according to the terms of my invention:

Example I

A hydrocarbon liquid produced by the catalytic dehydrogenation of butene-1 had the following approximate composition in parts by volume:

| | |
|---|---|
| Butadiene | 16 |
| Butenes | 73 |
| Paraffins | 9 |
| Methane and lighter | 2 |

This liquid was passed at a flow rate of one liquid volume per hour per volume of reagent over a reagent consisting of bauxite impregnated with 20 per cent by weight of cuprous chloride. The contacting temperature was 40° F. The flow of hydrocarbons was maintained through two successive beds of the reagent in separate towers until butadiene was no longer retained by the first tower in the series. The flow was then halted, the first tower was flushed with butadiene vapor from a supply previously separated, and the reagent was heated to about 190° F. to decompose the butadiene-cuprous chloride addition complex.

The butadiene evolved after cooling and condensing was found to be 99.2 per cent pure.

Example II

A hydrocarbon gas produced by the dehydrogenation of butenes had the following approximate composition in parts by volume:

| | |
|---|---|
| Butadiene | 4 |
| Butenes | 12 |
| Butane | 2 |
| Propane | 74 |
| Propylene | 6 |
| Ethane and lighter | 2 |

This gas was cooled to 40° F. and passed through a series of two towers filled with a reagent similar to that of Example I. 700 cubic feet per hour of gas was passed until the reagent in the first tower was completely spent.

The tower was flushed with pure butadiene vapor and the reagent was heated to 210° F. during circulation of heated butadiene vapor. The desorbed butadiene was condensed and recovered with a purity of over 99 per cent.

While the foregoing disclosure and examples have emphasized the recovery of butadiene, I have noted that my process is applicable to the recovery of other diolefins such as cyclopentadiene, isoprene, and various hexadienes from complex hydrocarbon mixtures.

I claim:

1. In a process for the recovery of butadiene from a hydrocarbon fluid containing the same by contacting said fluid at a temperature of from 40° to 80° F. with a solid reagent comprising cuprous chloride to cause said butadiene to selectively combine with said cuprous chloride to form a cuprous chloride-butadiene addition compound and subsequently in a separate step recovering said butadiene in substantially pure form from said addition compound by heating said addition compound to an elevated temperature of from 120° to 210° F. to thereby effect desorption of said butadiene from said compound, the improvement which comprises effecting said heating and thereby said desorption by contacting said compound with a heated substantially pure stream of butadiene which has been heated to a temperature which ranges from 120° to 210° F. and at which said desorption is conducted.

2. In a process for the recovery of butadiene from a hydrocarbon fluid containing the same by contacting said fluid at a temperature of from 40° to 80° F. with a bed of solid reagent comprising cuprous chloride to cause said butadiene to selectively combine with said cuprous chloride to form a butadiene-cuprous chloride addition compound and subsequently in a separate step recovering said butadiene in substantially pure form from said addition compound by heating said addition compound to an elevated temperature of from 120° to 210° F. to thereby effect desorption of said butadiene from said compound, the improvement which comprises passing a stream of substantially pure butadiene at a temperature below those causing decomposition of said addition compound through said reagent bed after said contacting step and thereby purging hydrocarbons other than butadiene from said bed and then effecting said heating and thereby said desorption by passing through said bed a heated substantially pure stream of butadiene which has been heated to a temperature which ranges from 120° to 210° F. and at which said desorption is conducted.

3. In a process of recovering substantially pure butadiene from a hydrocarbon fluid containing same by passing said fluid at 40° to 80° F. through a pervious reagent bed consisting of an adsorbent solid carrier impregnated with cuprous chloride and thereby causing the butadiene to be selectively absorbed from the fluid in the form of a complex with the cuprous chloride on the surfaces of the reagent and recovering substantially pure butadiene from the reagent bed by heating same from 120° to 210° F. to effect desorption of said butadiene therefrom, the improvement which comprises preventing contamination of said desorbed butadiene by the steps of; (1) purging said reagent bed after said absorption step by passing through the reagent bed a stream of substantially pure butadiene which is at a temperature below that at which decomposition of said complex takes place and thereby removing substantially all gases and hydrocarbons other than butadiene from said reagent without desorbing butadiene therefrom and thereafter (2) effecting said heating step and thereby said desorption of said butadiene from said complex by passing through the reagent bed a stream of substantially pure butadiene which is at a temperature of from 120° to 210° F. and at which said desorption is conducted.

4. In a process for the recovery of diolefins from hydrocarbon fluids containing the same by contacting at low temperature said fluids with a reagent comprising a monovalent salt of a heavy metal taken from groups I and II of the periodic system which forms solid addition compounds with diolefins to cause said diolefin to selectively combine with said salt to form said solid addition compound and subsequently in a separate step recovering said diolefin in substantially pure form from said solid addition compound by heating said solid addition compound at an elevated temperature at which desorption of said diolefin from said compound takes place, the improvement which comprises effecting said heating of said solid addition compound and thereby said desorption by contacting said solid addition compound with a heated substantially pure stream of said diolefin in vapor form, said diolefin vapor being heated prior to its introduction to the temperature at which said desorption is conducted.

5. In a process for the recovery of diolefins from hydrocarbon fluids containing the same and non-diolefinic hydrocarbons of substantially the same boiling range as said diolefins by contacting said fluids at low temperature with a reagent comprising a monovalent salt of a heavy metal taken from groups I and II of the periodic system which forms solid addition compounds with diolefins to cause said diolefin to selectively combine with said salt to form said solid addition compound and subsequently in a separate step recovering said diolefin in substantially pure form from said solid addition compound by heating same at an elevated temperature at which desorption of said diolefin therefrom takes place by decomposition of said solid addition compound, the improvement which comprises purging a mass of said solid addition compound containing non-diolefinic hydrocarbon in the gaseous phase within the interstices thereof and displacing said gaseous non-diolefinic hydrocarbons from said interstices prior to said heating and desorption step by intimately contacting said mass with a stream of said diolefin from an extraneous source in substantially pure form and at a temperature below that at which any substantial decomposition of said solid addition compound takes place and thereby removing substantially all said non-diolefinic hydrocarbon from said mass.

HARRY E. DRENNAN.